United States Patent [19]
Bailey

[11] Patent Number: 4,678,381
[45] Date of Patent: Jul. 7, 1987

[54] PORTABLE MACHINING TURNTABLE

[76] Inventor: Earl D. Bailey, 2255 Montrose Ave., Montrose, Calif. 91020

[21] Appl. No.: 575,170
[22] PCT Filed: Mar. 29, 1982
[86] PCT No.: PCT/US82/00381
§ 371 Date: Nov. 7, 1983
§ 102(e) Date: Nov. 7, 1983
[87] PCT Pub. No.: WO83/03378
PCT Pub. Date: Oct. 13, 1983

[51] Int. Cl.$^4$ .................. B23Q 3/02; B23Q 17/00
[52] U.S. Cl. .................. 409/221; 74/813 R; 408/71
[58] Field of Search .............. 409/220, 221, 224, 168; 29/38 C, 48.5 R, 48.5 A, 49; 408/71; 74/813 R, 813 C, 813 L

[56] References Cited

U.S. PATENT DOCUMENTS

| | | | |
|---|---|---|---|
| 1,396,302 | 11/1921 | Wagner | 409/221 |
| 2,480,618 | 8/1949 | Tresidder | 409/221 X |
| 2,570,444 | 10/1951 | Henkel | 74/813 R |
| 2,595,424 | 5/1952 | Studler | 409/168 |
| 3,496,832 | 2/1970 | Celinder et al. | 409/221 |
| 3,685,965 | 9/1972 | Bertoglio | 29/38 C |

Primary Examiner—Z. R. Bilinsky
Attorney, Agent, or Firm—Ted DeBoer

[57] ABSTRACT

A Portable Machining Turntable (PMT) (1) used in combination with a milling, grinding or drilling machine (101) to allow both single and compound angles to be worked. The PMT (1) is comprised of an integral housing (2) enclosing an electric stepping motor (23) that through two pulleys (22), (24) and a timing belt (27) drives a worm drive assembly (17). The worm (21) drives a worm gear (43) that rotates a rotary head (36). The power to operate the motor (23) is supplied and controlled by a conventional numerical control system. However, the PMT (1) includes a mechanical override that allows the rotary head (36) to be manually rotated. To operate the PMT (1) it is mounted to a mill bed by standard clamp blocks inserted into hold-down slots (14) located on the lower walls of the housing (2). The work piece is then attached to the rotary head (36) and the head is rotated to the desired work angle. If compound angles are required the PMT (1) is secured to standard machine vise, attached to the mill bed, and positioned within the vise to provide the first angle. The second angle is then produced by rotating the rotary head in the prescribed manner.

10 Claims, 14 Drawing Figures

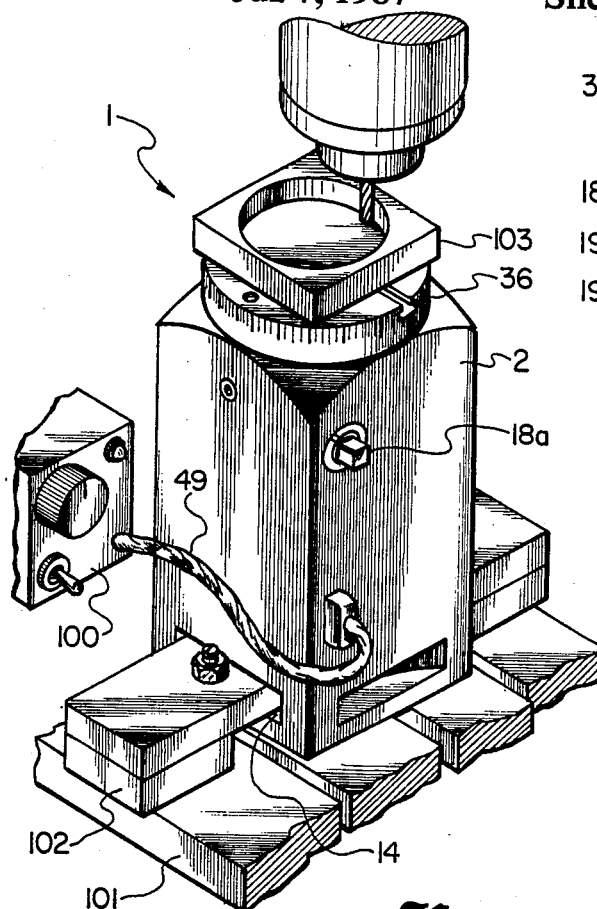
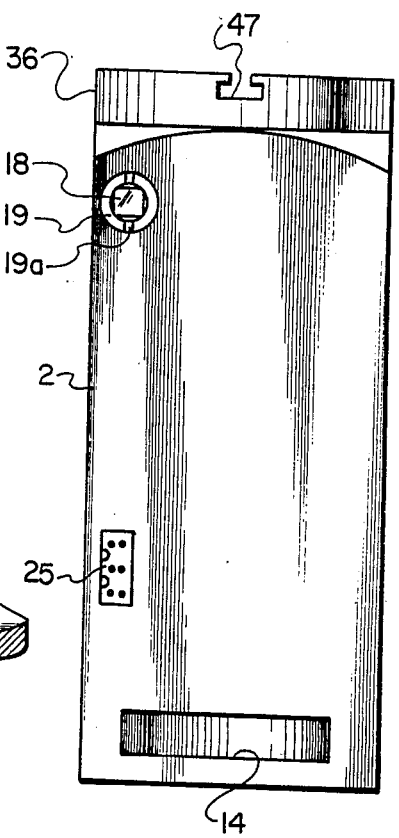
Fig.1.
Fig.2.
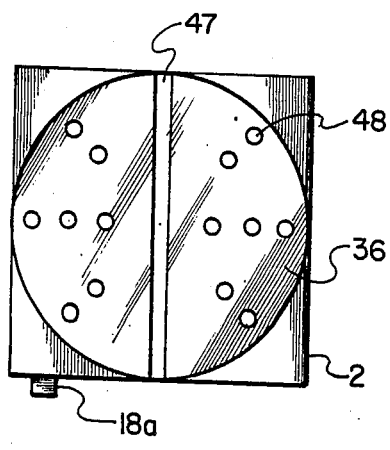
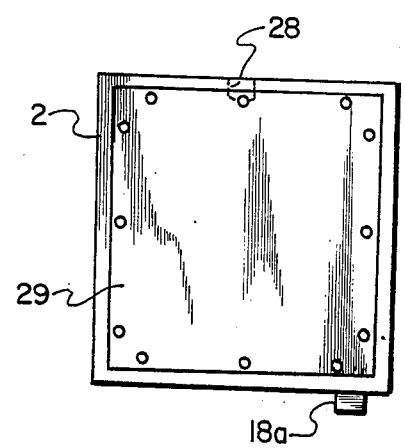
Fig.3.
Fig.4.

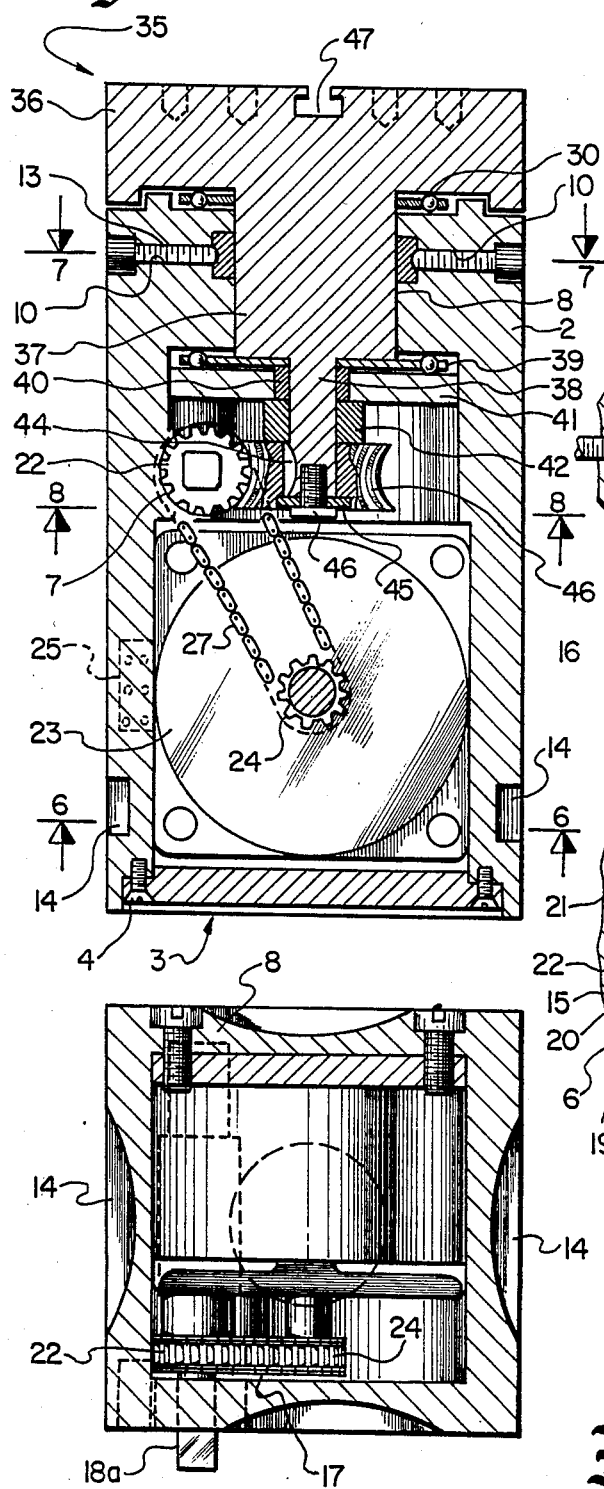
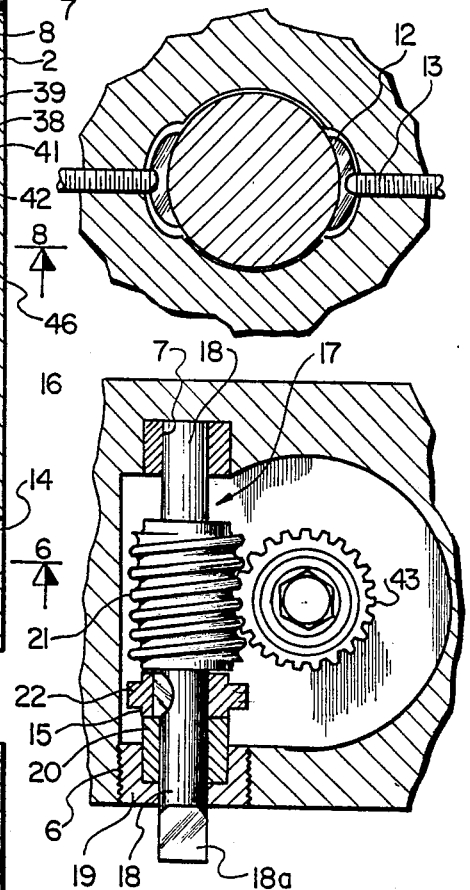
Fig.5.
Fig.7.
Fig.8.
Fig.6.

PORTABLE MACHINING TURNTABLE

TECHNICAL FIELD

This invention relates to rotary machining turntables and more particularly to portable machining turntables that can be electrically or mechanically rotated to allow single or compound angles to be milled, ground and/or drilled.

BACKGROUND ART

The problems encountered by machinist in setting-up single and particularly compound angles are enhanced by the unavailability of an easy-to-operate and versatile rotary head. The heads presently available are designed to be used either vertically or horizontally. To set-up compound angles with this type of head, the head must be shimmed or blocked to produce the second angle of a compound angle. Additionally, incremental increases or decreases in the angular displacement are difficult since for every change the shim must either be moved or increased/decreased and the angle remeasured. This type of set-up is not cost-effective since it is very time consuming and must be made by an experienced machinist.

A search of the prior art did not disclose any patents that disclosed the versatility and ease of handling provided by the instant invention. However, the following U.S. patents were determined to be related:

| U.S. PAT. NO. | INVENTOR | ISSUED |
| --- | --- | --- |
| 4,274,773 | Burkhardt | 23 June 1981 |
| 3,273,879 | Floren | 20 September 1966 |
| 3,197,197 | Butin | 27 July 1965 |

The Burkhardt patent discloses a rotary index table comprising a stationery table housing, a table plate for mounting the work piece and a rotation means mounted on the housing.

The Floren patent discloses a compound sine plate or holder which is tiltable to provide a support surface at various angles for working operation.

The Butin patent discloses a device for holding work pieces on a machine-tool table which contains one longitudinal groove aid part for locking a vise base to the machine table.

DISCLOSURE OF INVENTION

The Portable Machining Turntable (PMT) is used combination with a milling, grinding or drilling machine to allow both single and compound angles to be worked. Two embodiments of the PMT are disclosed with the preferred embodiment powered by an electrical motor with a mechanical override and a solely mechanical model. The electrical model is comprised of an integral housing enclosing an electric stepping motor that through two pulleys and a timing belt turns a worm drive assembly incorporating a worm. The worm drives a worm gear that in-turn rotates a rotary head on which the work piece is mounted. The mechanical model excludes the electrical motor and associated components and is mechanically configured to allow the rotary head assembly to be rotated by a socket wrench. The power to the stepping motor is supplied and controlled by a standard numerical control system that is not a part of the invention.

The PMT is operated by mounting it to the machine base by use of standard clamp blocks that are inserted into hold-down slots located on the lower outside walls of the PMT housing. The work piece is then secured to the top of the rotary head by means of the T-channel slot and/or the threaded mounting holes. Once the work piece is secured the rotary head is rotated to the desired working angle. If a compound angle is required the PMT is clamped to a standard machine vise and the PMT is positioned within the vise at any angle between 0 and 90 degrees to provide the first angle. The second angle is then produced by rotating the rotary head in the prescribed manner.

In addition to providing an improved and simplified method for accurately setting-up single and compound angles it is also an objective of the invention to provide an apparatus that:

is adaptable for use in large and small machine shops that mill, grind or drill, can be easily set up and operated by one person is reliable and easily maintainable.

BRIEF DESCRIPTION OF THE DRAWINGS

The details of the Portable Machining Turntable (PMT) are described in connection with the accompanying drawings in which:

FIG. 1 is an isometric view of the overall electrical PMT attached to a mill bed.

FIG. 2 is an exterior side view of the electrical PMT.

FIG. 3 is a top view showing the T-channel and a typical mounting hole configuration of the rotary head.

FIG. 4 is a bottom view of the electrical PMT.

FIG. 5 is a cross-sectional side view of the electrical PMT.

FIG. 6 is a cross-sectional top view of the electrical PMT.

FIG. 7 is a cross-sectional view taken along lines 7—7 of FIG. 5 showing the details of the shaft brake.

FIG. 8 is a cross-sectional view taken along lines 8—8 of FIG. 5 showing the details of the worm drive assembly and worm gear.

BEST MODE FOR CARRYING OUT THE INVENTION

Figure 9:
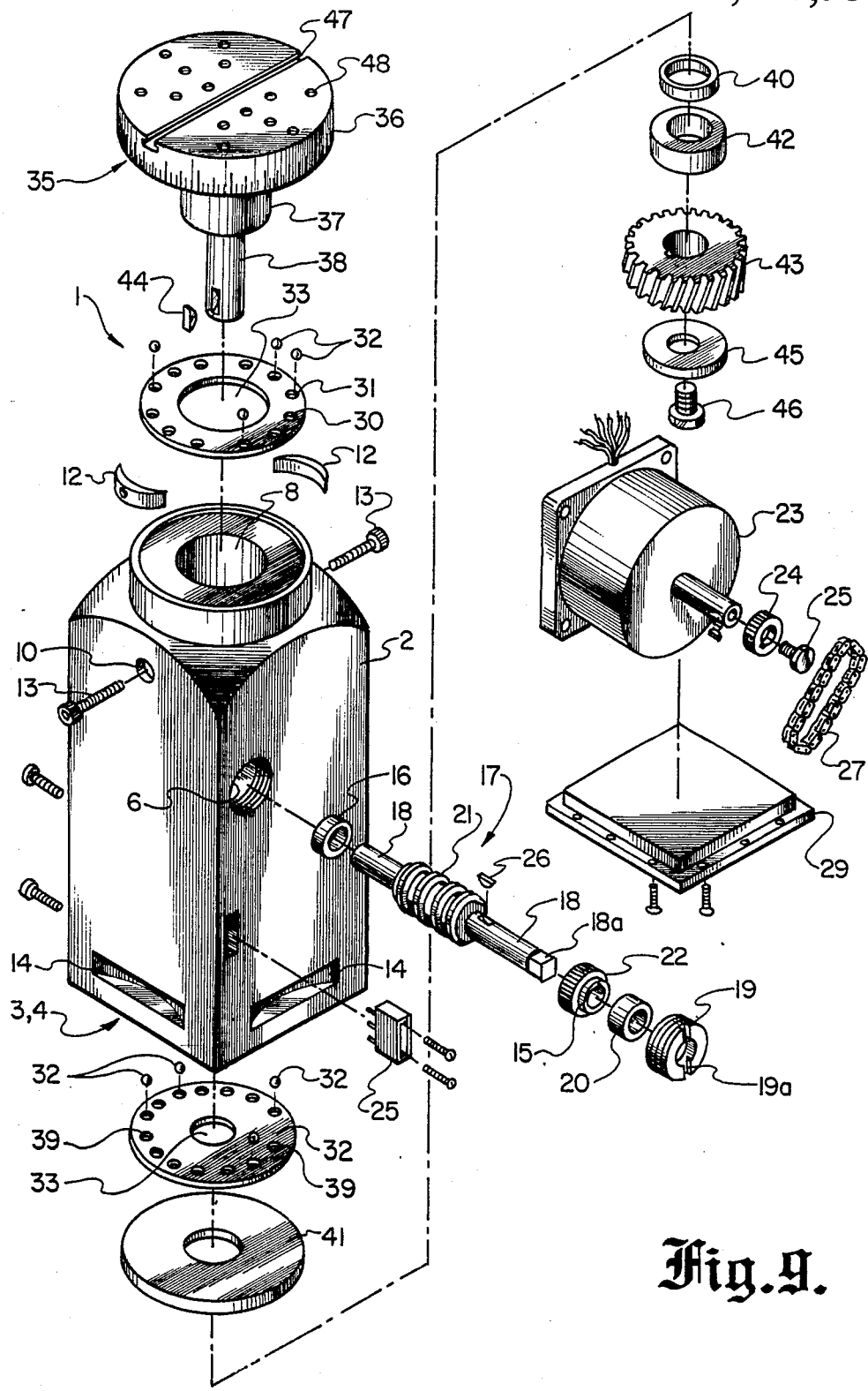
FIG. 9 is an exploded view of the electrical PMT.

The Portable Machining Turntable (PMT) 1 is described in terms of two embodiments. The first embodiment described is considered the preferred and best mode forcarrying out the invention. The preferred embodiment functions primarily by electrical means and secondarily, if required, by mechanical means. The second embodiment performs the same function as the first but functions solely by mechanical means. The numbering sequence from 1 through 49 is applicable to the first embodiment, from 50 to 90 to the second embodiment; and 100 to 110 applies to items outside the scope of the invention. The PMT 1 can be used in combination with a milling, grinding or drilling machine.

However, for explanatory purposes it is described in terms of its use with a milling machine.

The preferred embodiment of the PMT 1 is comprised of five major parts: an integral housing 2, a worm drive assembly 17, a worm gear 43, an electric stepping motor 23, and a rotary head assembly 35.

The housing 2 is machined from an integral piece of material which in the best mode is made of tool steel. The housing, as best shown in FIGS. 1 and 5, has two cavities: a first cavity 3 extending upwardly from the bottom and a shallow second cavity 4 that extends over the opening of the first cavity 3. Within the limits of the first cavity 3 there is located on one wall a first bore 6 that is in alinement with a partial second bore 7 located on the opposite wall. Within the first bore 6 and second bore 7 there is conventionally inserted a first bushing 15 and a second bushing 16 respectively. The bushings are used to rotatably attach a worm drive assembly 17, as best shown in FIG. 9, that is comprised of: a worm drive shaft 18 where one end of the shaft is rotatably inserted and contained within the second bushing 16 and where the other end is rotatably inserted through the first bushing 15 and protrudes through the first bore 6 and a worm shaft retaining nut 19. The retaining nut 19 has a slot 19a that allows the nut to be screwed into the first bore 6. The protruding end of the shaft as shown in FIG. 1 has a square end 18a that allows a socket wrench 88 to be attached when mechanical rotation of the rotary head assembly 35 is required.

Located within the confines of the shaft 18 commencing from the second bushing 16, is a worm 21. The worm 21 may be machined as an integral part of the shaft 18 or may be inserted and radially locked by means of a conventional locking key. Adjacent to the worm 21 is a first geared pulley 22 that is radially locked by means of a locking key 26. A washer 20 is next inserted that abutts against the first bushing 15 and the worm shaft retaining nut 19.

Within one of the inside walls of the first cavity 3, as shown in FIG. 5, there is mounted, by conventional means, the electric stepping motor 23. The motor is a type M091-FD09 or equivalent manufactured by Minarek Electric Company located in California, United States of America. The motor is the best mode operates at 20 RPM, has a forward and reverse capability and is powered by a DC voltage applied through an electrical connector 25 housed within a fourth bore 9 located on one of the housing 2 walls. The power to the stepping motor 23 is supplied through a cable assembly 49 and is controlled by a standard numerical control system 100 that is not a part of this invention.

Rigidly attached to the shaft of the motor 23 is a second geared pulley 24 that is located on the same plane as the first geared pulley 22. Around the first and second geared pulley 22 and 24 is a timing belt 27. The belt 27 used in the preferred embodiment is a Gates timing belt manufactured by the Gates Tire and Rubber Company located in Colorado, United States of America.

The first ball bearing race assembly 30 is set on top of the housing 2 as best shown in FIG. 9. The assembly 30 is comprised of a circular race having a plurality of bore 31 housing on equal plurality of ball bearings 32. In the best mode there are twelve bores and twelve ball bearings. The assembly 30 also has a concentric bore 33.

The rotary head assembly 35 as shown in FIGS. 5 and 9 is comprised of a circular rotary head 36 that in the best mode has an integral concentric first shaft 37 and a contiguous second shaft 38 of a lessor diameter than the first shaft 37. The bottom of the head 36 rests on top of the first ball bearing race assembly 30 with the first shaft 37 extending through the bore 33 in the assembly 30 and through the third bore 8 in the housing 2.

A second ball bearing race assembly 39 is constructed in a similar manner as the first ball bearing race assembly 30 with the exception that the diameter of the concentric hole is slightly smaller to accommodate the diameter of the second shaft 38 of the rotary head assembly 35. The race assembly 39 is held against the bottom of the first shaft 37 by a pressure plate 41. By having two race assemblies 30, 39 the rotary head 36 can be rotated with a minimum of friction.

The second shaft 38 is inserted through a second shaft bushing 40 that is held in place by a spacer 42. The spacer 42 is sized to allow the worm gear 43 to be positioned on the shaft 38 so that it will mesh with the worm 21 as shown in FIGS. 5 and 8. The worm gear is held in place radially in the shaft 38 by a keylock 44 and is held laterally within the shaft 38 by a combination compression washer 45 and bolt 46.

Once the rotary head assembly 35 is rotated to the desired position the first shaft 37 is locked in place by a set of brakes 12 as shown in FIG. 7. The brakes are adjusted by the brake screws 13 inserted in the first threaded hole 10 and second threaded hole 11.

Figures 12, 13:
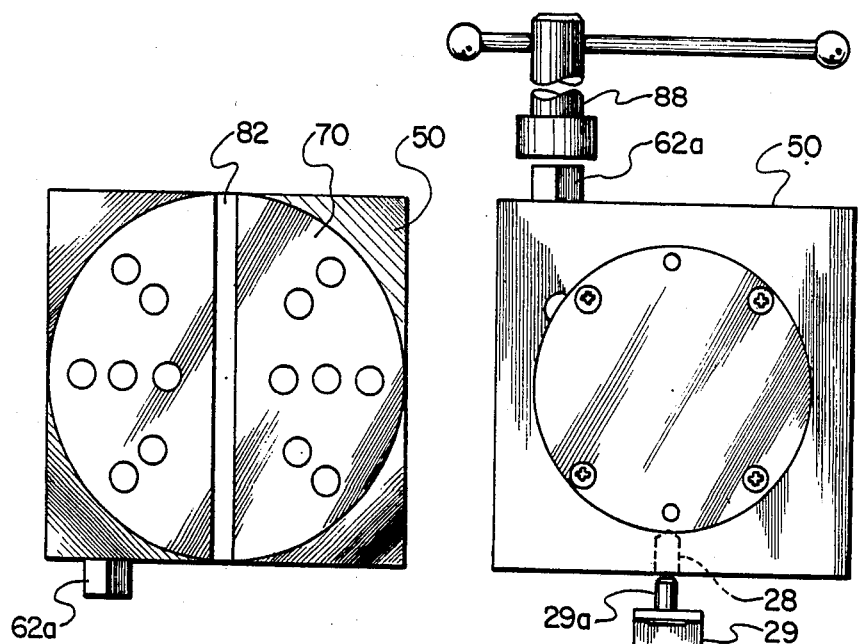
FIG. 12 is an exterior top view of the manually operated PMT.
FIG. 13 is an exterior bottom view of the manually operated PMT.
Figure 14:
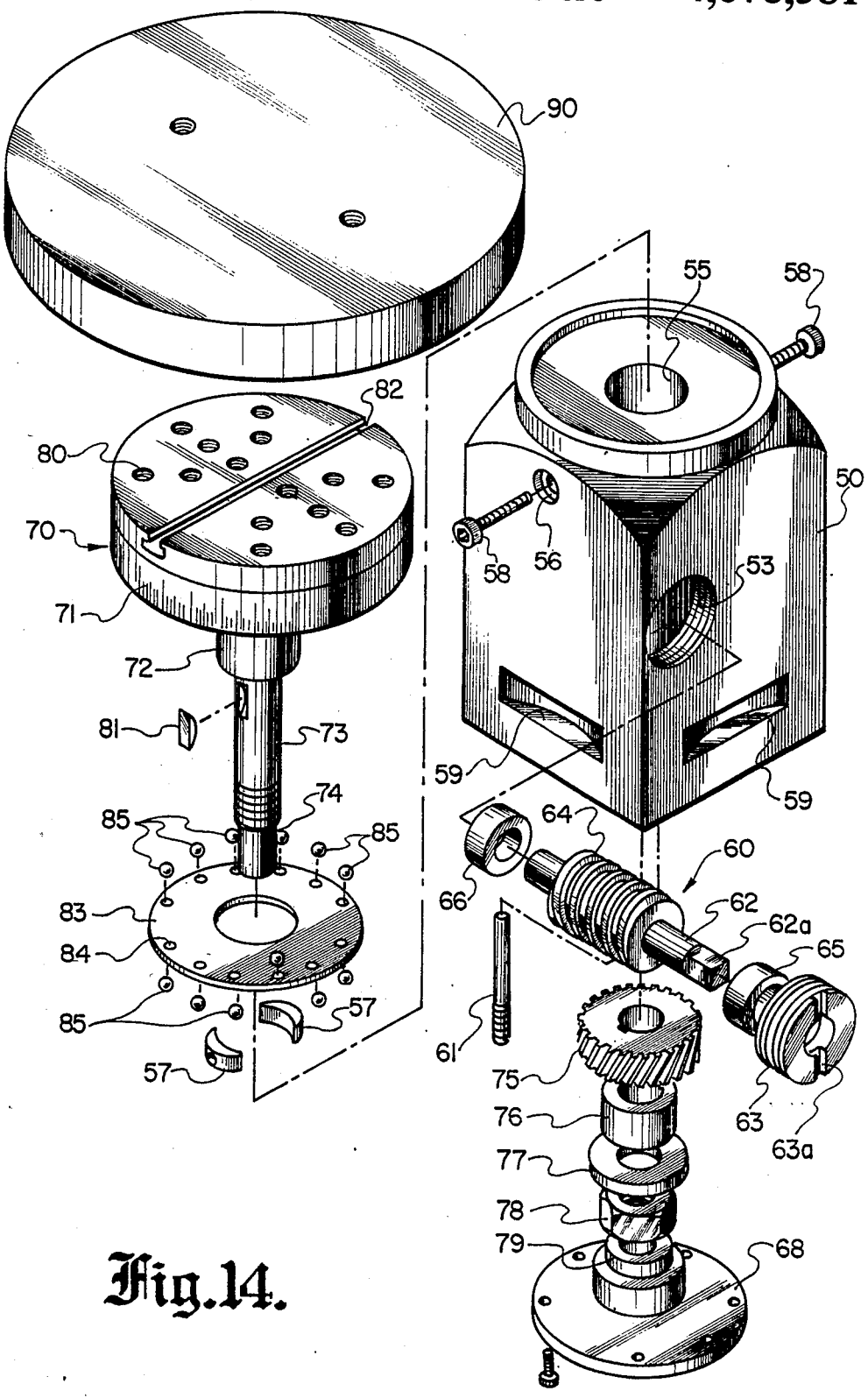
FIG. 14 is an exploded view of the manually operated PMT.

When the PMT is in operation it is mounted on the mill bed 101, as shown in FIG. 1, by means of the clamp blocks 102 inserted into the hold-down slots 14 located on each outside lower wall of the housing 2. The work piece 103 is mounted to the circular rotary head 36 by means of the T-channel slot 47 and/or the threaded holes 48 located in a mounting configuration as best shown in FIG. 12. If a larger work piece 103 is to be worked it is mounted to an extension plate 90, as shown in FIG. 14, and the plate 90 is attached to the circular rotary head 36. The rotary head 36 is rotatable in one-degree increments and in the best mode the head is rotated by electrical means. However, it is also possible to rotate the head by mechanically rotating the shaft 18a by means of the socket wrench 88.

When compound angles are required, the PMT 1 is secured to a standard machine vise conventionally attached to the mill bed 101. The PMT is then angularly positioned within the vise to provide the first angle. The second angle is then produced by rotating the rotary head 36 in the prescribed manner. To facilitate and stabilize the angular rotation of the housing 2 within the vise, a vise plate 29 as shown in FIG. 13 is set into one side of the vise jaws. The vise plate 29 consists of a 90 degree angle plate that has a swivel pin 29a rigidly and conventionally attached to the vertical external side of the plate. The pin 29a is then inserted into a corresponding partial swivel bore 28 located on one of the side walls of the housing 2 and the housing is rotated to the desired angle. Once the angle is set the vise jaws are tightened to maintain the selected angle.

The second embodiment of the PMT 1 is comprised of five major parts: an integral housing 50, a worm drive assembly 60, a worm gear 75, a rotary head assembly 70, and a socket wrench 88.

Figure 10:
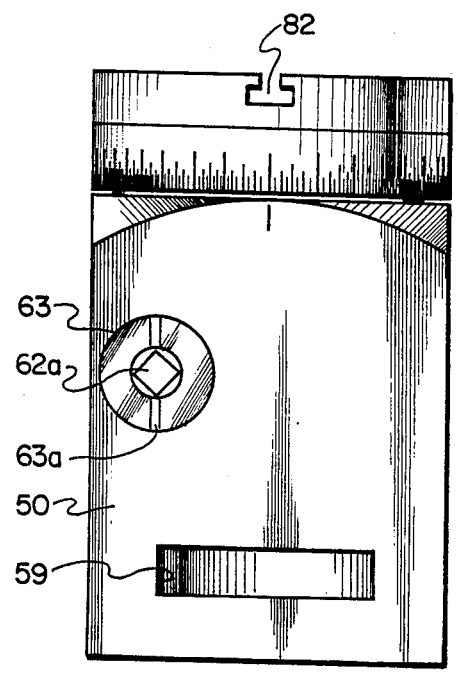
FIG. 10 is a side view of the manually operated PMT.
Figure 11:
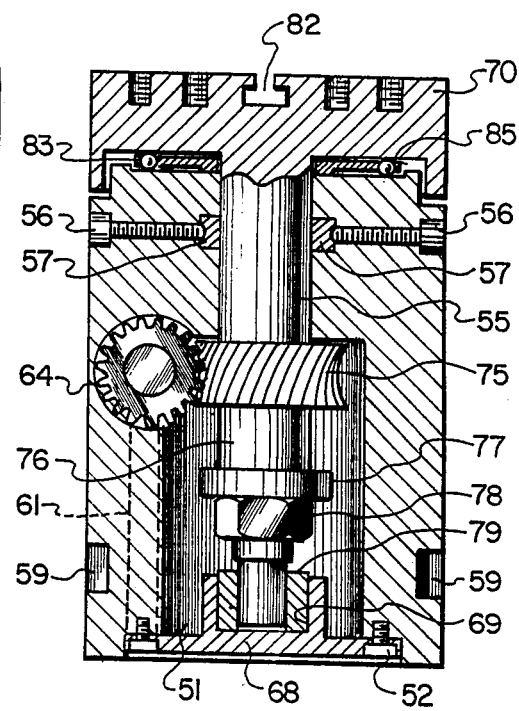
FIG. 11 is a cross-sectional side view of the manually operated PMT.

The housing 50, as in the first embodiment, is machined from an integral piece of material which in the best mode is made from tool steel. The housing, as best shown in FIGS. 10 and 11 has two cavities: a first cavity 51 extending upwardly from the bottom; and a shallow second cavity 52 that extends over the opening of the first cavity 51. Within the limits of the first cavity 51 there is located on one wall a first bore 53 that is in alinement with a second bore 54 located on the opposite wall. Within the first bore 53 and second bore 54 there is conventionally inserted a first bushing 65 and a second bushing 66 respectively. The bushings are used to rotatably house a worm drive assembly 60, as best shown in FIG. 14, that is comprised of a worm shaft 62 and a worm 64. One end of the shaft is rotatably inserted and contained within the second bushing 66 and the other end is rotatably inserted through the first bushing 65 and protrudes through the first bore 53. The shaft is held concentrically in place by a worm shaft retaining nut 63 that has a slot 63a that allows the nut to be screwed into the first bore 53. The protruding end of the shaft as shown in FIG. 12 has a square end 62a that allows the socket wrench 88 to be inserted when rotation of the rotary head assembly 70 is required. The second embodiment also includes a worm shaft drag pin 61 that when the pin is pressed against the worm shaft 62 a shaft drag is produced. The pin 61, which is made of nylon and is partially threaded, is inserted into a partially threaded bore 67 extending upwardly from the top surface of the second cavity and is in alignment with the worm shaft 62. The drag pressure is set and made only once after which the bottom plate 68 is attached to the housing. The shaft drag prevents the shaft 62 from rotating when the shaft is subjected to vibratory stresses during machine operation.

The rotary head assembly 70 is comprised of a circular rotary head 71 that has extending from its bottom side an integral concentric first shaft 72, a contiguous second shaft 73 having a lower threaded portion and of lessor diameter than the first shaft, and a contiguous third shaft 74 of lessor diameter than the second shaft 73.

The shaft 72 is inserted into the bore 86 of the ball bearing race assembly 83 and through the third bore 55 of the housing 50. The assembly 83 as in the best mode, is comprised of a circular race having twelve bores 84 housing an equal number of ball bearings 85. The assembly 83 is sized to rest on top of the housing 50 as best shown in FIG. 11. Inserted into the second shaft 73 is the worm gear 75 which is positioned on the shaft 73 so that it will mesh with the worm 64 as best shown in FIG. 11. The worm gear is held in place radially in the shaft 73 by a keylock 81 and is held laterally within the shaft by a spacer 76. The spacer is held in place by a washer 77 and nut 78 combination inserted into the threaded portion of the second shaft 73. The third shaft 74, as best shown in FIG. 11 is inserted into a third shaft bushing 79 that is held by friction in a cavity 69 located on the upper part of the bottom plate 68. The bottom plate, which is sized to fit into the second cavity 52 of the housing 50, is held in place by four machine screws threaded into the bottom of the second cavity 52.

Once the rotary head assembly 70 is rotated to the desired angular position by the socket wrench 88, the second shaft 73 is locked in place by a set of brakes 57 as shown in FIG. 11. The brakes are adjusted by the brake screws 58 inserted into the threaded holes 56.

When the PMT is in operation, it is mounted to the mill bed 101, as shown in FIG. 1, by means of the hold-down slots 59 located on each outside lower wall of the housing 50. The work piece 103 is mounted to the circular rotary head 36 by means of the T-channel slot 47 and/or the threaded holes 48 located in a mounting configuration as best shown in FIG. 12. The mounting area of the circular rotary head 71 may be extended by attaching an extension mounting plate 90 as shown in FIG. 14. The plate is attached to the circular rotary head 71 by two machine bolts.

If compound angles are required the PMT 1 can be secured to a standard machine vise attached to the mill bed 101. The PMT is then angularly positioned within the vise to provide the first angle. The second angle is then produced by rotating the head 71 in a conventional manner as described supra.

I claim:

1. A portable machining turntable comprising:
   (a) an integral elongated housing having two pairs of opposed parallel side walls forming a square cross section adapted to be clamped by a standard machine vise, and a top wall having a shallow third cavity or recess, said side walls and top forming a first cavity extending upwardly from the bottom, having a shallow second cavity extending over the opening of the first cavity, a first threaded bore located on one of the side walls of the first cavity in alignment with a second bore located on the opposite side wall, a third bore extending from the top of said housing and aligned with the center of the first cavity, a first threaded hole extending through one of the side walls in alignment with a second threaded hole through the opposite side wall, and a plurality of hold-down slots located in the lower outer sides of said said walls of said housing,
   (b) a first bushing and a second bushing inserted within the first bore and second bore respectively,
   (c) a worm drive assembly comprising:
      (1) a worm shaft where the ends of said shaft are rotatably inserted and retained by said first bushing and said second bushing,
      (2) a worm rigidly attached to said shaft,
      (3) a first geared pulley rigidly attached to said shaft,
      (4) a worm shaft retaining nut screwed into the first bore, where end of the worm shaft protrudes outside the nut,
   (d) an electric stepping motor rigidly mounted to one of the inside walls in the first cavity of said housing,
   (e) a second geared pulley rigidly attached to the shaft of said motor, and located on the same plane as said first geared pulley,
   (f) a timing belt looped around and held tight by said first geared pulley and said second geared pulley,
   (g) a first ball bearing race assembly having a plurality of bores housing an equal plurality of ball bearings and having a central bore extending therethough where said assembly is set within the third cavity in said housing,
   (h) a rotary head assembly comprising:
      (1) a circular rotary head having a concentric first shaft and a contiguous second shaft of lesser diameter than the first shaft where a bottom of said head rests on top of said first ball bearing race assembly and where the first shaft extends through the bore in said first ball bearing race assembly and through the third bore in said housing,
      (2) a second ball bearing race assembly having a plurality of bores housing an equal plurality of ball bearings and having a central bore extending therethrough where said assembly is inserted about the second shaft of said rotary head,
      (3) a bushing inserted into the second shaft, (4) a pressure plate inserted onto the second shaft of said rotary head around said bushing and thus maintains the second ball bearing race assembly against the bottom of the first shaft, (5) a spacer inserted onto the second shaft where an upper end of said spacer rests against the bottom of said pressure plate, (6) a worm gear inserted onto the second shaft where its upper end rests against the bottom of said spacer, such that said worm gear meshes with said worm, where said worm gear is held radially stationery by a key lock and is maintained longitudinally in place by a combination compression washer and bolt inserted into the end of the second shaft, (i) a set of brakes and a corresponding set of brake adjusting screws inserted into the first threaded hole and second threaded hole in said housing, (j) an electrical female plug externally inserted through a fourth bore and attached to a wall of said housing, and (k) an electrical power cable having a corresponding male connector that attaches to said female plug and supplies the power to operate said electric stepping motor.

2. A portable machining turntable comprising:

(a) an integral elongated housing having two pairs of opposed parallel side walls forming a square cross section adapted to be clamped by a standard machine vise, and a top wall having a shallow third cavity or recess, said side walls and top forming a first cavity extending upwardly from the bottom, having a shallow second cavity extending over the opening of the first cavity, a first threaded bore located on one of the side walls in alignment with a second bore located on the opposite side wall, a third bore extending from the top of said housing and aligned with the center of the first cavity, (b) a first bushing and a second bushing inserted within the first bore and second bore respectively, (c) a worm drive assembly comprising:
(1) a worm shaft where the ends of said shaft are inserted and retained by said first bushing and said second bushing,
(2) a worm concentrically attached to said shaft,
(3) a worm shaft retaining nut screwed into the first bore, where end of the worm shaft protrudes outside the nut, (d) a ball bearing race assembly having a plurality of bores housing an equal plurality of ball bearings and having a concentric bore extending therethrough where said assembly is set within the third cavity in said housing, (e) a rotary head assembly comprising:
(1) a circular rotary head having a concentric shaft where bottom of said head rests on top of said ball bearing race assembly and where the shaft extends through the bore in said ball bearing race assembly and through the the third bore in said housing,
(2) a worm gear attached to the bottom end of said rotary head shaft where said worm gear meshes with said worm, a fourth partially threaded bore extending upwardly from the top surface of the second cavity and in alignment with said worm shaft.

3. The portable machining turntable as specified in claim 1 or 2 wherein the external side perimeter of said rotary head has marks incrementally spaced.

4. The portable machining turntable as specified in claims 1 or 2 wherein the top of said rotary head has an inverted T-channel extending across said rotary head diameter and also having a plurality of threaded mounting holes.

5. The portable machining turntable as specified in claims 1 or 2 wherein said first and second bushings are made of self-lubricating bronze.

6. The portable machining turntable as specified in claim 1 wherein said stepping motor in combination with said first and second geared pulleys and said timing belt steps in increments corresponding to the incremental marks located on side of said rotary head.

7. The portable machining turntable as specified in claims 1 or 2 further comprising a vise plate with a 90 degree angular plate sized to fit into one side of a standard machine vise jaw and having a swivel pin rigidly and conventionally attached to the vertical external side of said plate.

8. The portable machining turntable as specified in claim 7 wherein one side of said housing having a partial bore of slightly larger diameter than said swivel pin attached to said vise plate.

9. The portable machining turntable as specfied in claim 2 further comprising a worm shaft drag pin that is partially threaded and that is inserted into said fourth bore in said housing.

10. The portable machining turntable as specified in claims 1 or 2 further comprising a socket wrench sized to fit into the end of the protruding worm shaft of said worm drive assembly.

* * * * *